July 8, 1924.
H. L. BREWSTER
TRAFFIC SIGNAL FOR MOTOR VEHICLES
Filed Nov. 29, 1922
1,500,601
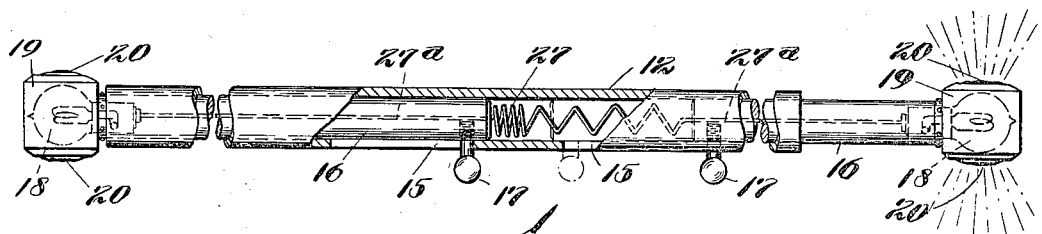
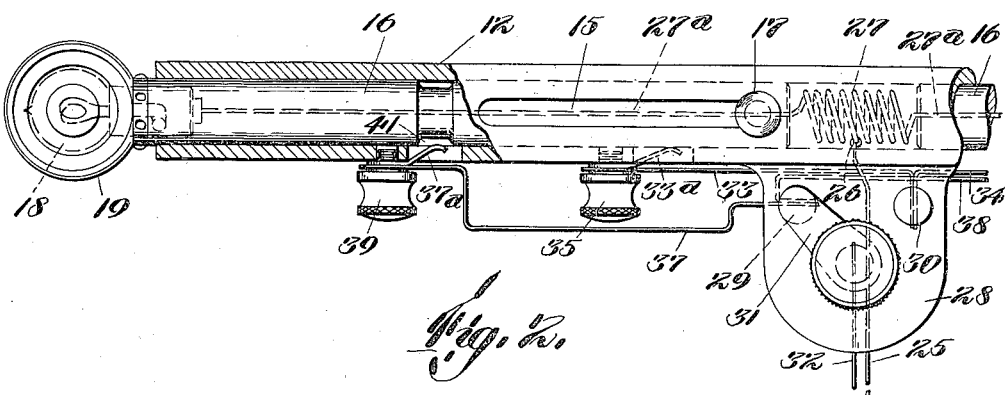
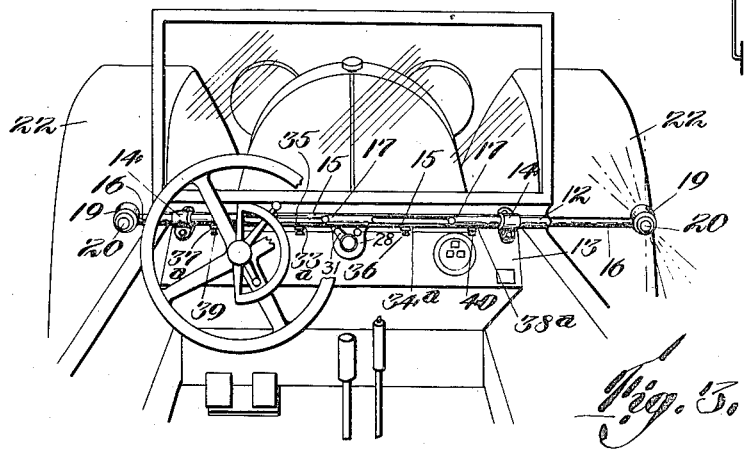
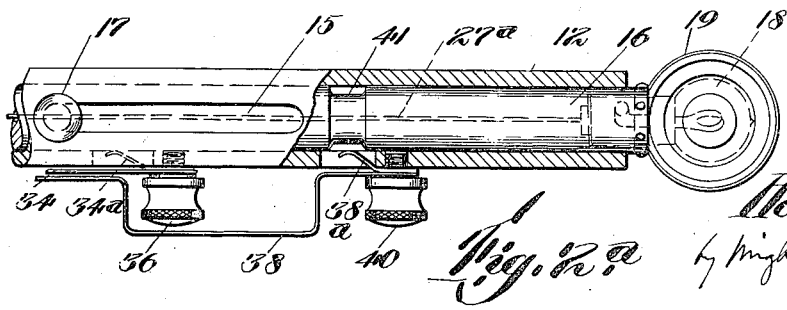
Inventor:
Harry L. Brewster Patented July 8, 1924.

1,500,601

UNITED STATES PATENT OFFICE.

HARRY L. BREWSTER, OF SOMERSWORTH, NEW HAMPSHIRE.

TRAFFIC SIGNAL FOR MOTOR VEHICLES.

Application filed November 29, 1922. Serial No. 603,968.

*To all whom it may concern:*

Be it known that I, HARRY L. BREWSTER, a citizen of the United States, residing at Somersworth, in the county of Strafford and State of New Hampshire, have invented new and useful Improvements in Traffic Signals for Motor Vehicles, of which the following is a specification.

This invention, which I call a sliding light traffic signal, has for its chief object to so install a pair of electric lamps on the side of the dash or instrument board of a motor vehicle facing the driver, that the driver is enabled to conveniently project either lamp sidewise from the vehicle, one to the right, and the other to the left, as a notice to others of an intended turning in either direction, and to retract the lamp to an inconspicuous position.

Another object is to enable the operation of retracting the lamps to automatically render the same inoperative.

Another object is to enable the lamps to be made operative when retracted, so that they constitute the lamps of a parking signal.

I attain these and other related objects by the construction and arrangement hereinafter described and claimed.

Of the accompanying drawings forming a part of this specification,—

Figure 1 is a top plan view of a traffic signal, embodying the invention, parts being broken away, a portion of the fixed guide being shown in section.

Figure 2 is a side elevation on a larger scale, showing a portion of the signal, a part of the guide being shown in section. Figure 2$^a$ shows the portion omitted from Figure 2.

Figure 3 is a perspective view, looking toward the inner side of the dash or instrument board of a motor vehicle, and showing a signal embodying the invention, installed on the dash, one of the lamps being projected, and the other retracted.

The same reference characters indicate the same parts in all of the figures.

In the drawings, 12 represents a guide provided with means whereby it may be attached to the dash 13 of a motor vehicle, in a substantally horizontal position, and extending crosswise of the vehicle body, said means being in this instance, a pair of clamps 14, fixed to the dash and confining the guide. The guide 12 is preferably a tube of insulating material, such as vulcanzed fiber, open from end to end and provided with longitudinal slots 15, for a purpose presently described. I prefer to elongate the guide, so that it extends substantially from end to end of the dash.

Longitudinally movable in the guide are two independent slides 16, each being preferably a cylindrical rod having a sliding fit in the guide. Each slide has a handle 17, projecting through a slot 15 in the guide, whereby the driver may move the slide, the handle and the ends of the slot constituting stop means whereby the movement of the slide in each direction is limited.

Fixed to the outer end of each slide is an incandescent electric lamp including a bulb 18, and a casing 19, enclosing the bulb, and provided with lenses 20, facing in opposite directions, and preferably of red glass, the preferred arrangement being such that one lens faces forward, and the other rearward.

Each lamp is adapted to be projected from one side of the body to a conspicuous position, without projecting beyond the plane of the outer edge of the corresponding mud guard 22, and is also adapted to be retracted to an inconspicuous position close to the side of the body.

Any suitable means may be provided for controlling the operation of the lamps, that is to say, lighting and extinguishing the same, said means being operative in all positions of the slides, and preferably organized as next described.

A conducting wire 25, which may communicate with any source of electrical energy, for example, a battery conventionally shown by Figure 2, enters the guide 12 at a fixed point 26, and is connected within the guide with a longitudinal conducting wire extending through the guide and the slides 16, to the lamps. Said longitudinal wire includes a coiled portion 27, stored loosely in the guide between the slides, and portions 27$^a$ fixed to and extending through the slides. The wires 25, 27 and 27$^a$ constitute conductors connecting the battery with the lamp and including loose portions conforming to movements of the slides. A two-point switch is provided including a base 28, fixed to the guide and terminals 29 and 30 on the base, and a pivoted switch-arm 31, adapted to make contact with either terminal. A conducting wire 32 is connected with the switch-arm. Wires 33 and 34 connect the switch terminal 30 with inner terminals 33$^a$ and 34$^a$ here shown as springs secured to the guide by binding screws 35 and 36. The inner terminal 33ª and screw 35 are shown by Figure 2, and the inner terminal 34ª and screw 36 are shown by Figure 2ª. Said inner terminals are adapted to contact at all times with the slides 16, which are of conducting metal. Wires 37 and 38 connect the switch terminal 29 with the outer terminals 37ª and 38ª here shown as springs, secured to the guide by binding screws 39 and 40. The outer terminal 37ª and screws 39 are shown by Figure 2, and the outer terminal 38ª and screw 40 are shown by Figure 2ª. The outer terminals 37ª and 38ª are adapted to contact with the slides, excepting when recesses 41 in the slides coincide with said terminals. Each slide is provided with a recess 41, and the recess of each slide is arranged to coincide with the corresponding outer terminal, and break the circuit when the slide is retracted, as shown by Figure 2 and Figure 2ª, provision being thus made for automatically rendering the retracted lamp inoperative.

When the switch-arm contacts with the switch terminal 29, the projected lamp is rendered operative, and the retracted lamp inoperative. When it is desired to provide a parking signal, both lamps being operative when retracted, the switch-arm is moved to contact with the switch terminal 30.

It will now be seen that an embodiment of the invention may be provided by omitting one of the slides 16 and its lamp, the invention residing in a guide 12 of any suitable length, an inner terminal 33ª or 34ª attached to an inner portion of the guide, an outer terminal 37ª or 38ª attached to an outer portion of the guide, a conducting slide 16 adapted to be manually projected and retracted in the guide and provided with an electric lamp at its outer end, means as described, whereby either of said terminals may be selectively connected with a source of electrical energy, such as a battery, and the other terminal disconnected therefrom; the arrangement being such that when the outer terminal is connected with the battery, the lamp is lighted by the projection of the slide, to serve as a direction signal, and extinguished by the retraction of the slide, and when the inner terminal is connected with the battery, the lamp remains lighted in all positions of the slide, i. e., both when the slide is projected and retracted, the lamp serving as a parking signal when the slide is retracted. I use the word battery in the appended claim for the sake of convenience, and not in a limiting sense, it being obvious that any other source of electrical energy may be employed.

I claim:

A traffic signal comprising an insulating guide, mean for attaching it in a substantially horizontal position to a motor vehicle dash, an inner terminal attached to an inner portion of the guide, an outer terminal attached to an outer portion of the guide, a conducting slide adapted to be manually projected and retracted in the guide and provided with an electric lamp at its outer end, the slide being formed to continuously contact with said inner terminal and provided with a recess which prevents its contact with the said outer terminal only when the slide is retracted, a battery, a conductor connecting the battery with the lamp, and including a portion movable with the slide and a loose portion conforming to movements of the slide, means including conductors, and a switch whereby either of said terminals may be selectively connected with the battery and the other terminal disconnected therefrom, the arrangement being such that when the outer terminal is connected with the battery, the lamp is lighted by the projection of the slide to serve as a direction signal, and extinguished by the retraction thereof, and when the inner terminal is connected with the battery, the lamp is lighted in all positions of the slide, so that it may serve as a parking signal when the slide is retracted, and a traffic signal when the slide is projected.

In testimony whereof, I have affixed my signature.

HARRY L. BREWSTER.